June 24, 1924.

J. E. LEONARZ

ELECTRIC FURNACE

Filed Sept. 17, 1921

Inventor
Johann Emil Leonarz.

By Gordon & Stewart
Attorneys.

Patented June 24, 1924.

1,499,020

UNITED STATES PATENT OFFICE.

JOHANN E. LEONARZ, OF TACUBAYA, MEXICO.

ELECTRIC FURNACE.

Application filed September 17, 1921, Serial No. 501,384.

*To all whom it may concern:*

Be it known that I, JOHANN EMIL LEONARZ, a citizen of Germany, residing in Tacubaya, D. F., Mexico, have invented certain new and useful Improvements in Electric Furnaces, for which the following is a full and complete specification, reference being had to the accompanying drawings.

It is the purpose of this invention to provide an improved electric furnace for metallurgical purposes. The electric furnace is preferably of the arc type in which the electrode is brought in circuit with the bath of molten metal by means of an arc whose heat is sufficient to maintain the metal in molten condition and to supply energy for further chemical reactions which it is important to accomplish during this operation.

One of the problems connected with the construction and design of the electric furnaces is the necessity for maintaining the electrode relatively cool and thus proof against material destruction other than on the arcing surface. By my design the electrode is maintained at a reduced temperature throughout the greater part of its length while at the same time a seal is provided, preventing the escape of the gases from the furnace along the surface of the electrode, where the same passes through the furnace walls.

A further object of my invention is the introduction of gases through the walls of the furnace and particularly through the roof to maintain the latter cool. In this way the life of the furnace is materially lengthened and replacement minimized.

Another object of my invention is the utilization of the incoming gas for reduction purposes after it has been heated. This may be carried out immediately after the gases have been introduced or after they have been subjected to chemical change by reason of their contact with the molten bath and carbonaceous material which may be present.

The utilization of the reduced gases is the subject matter of my copending application Serial No. 501,385, filed of even date herewith.

Other advantages of my invention will be evident from the following description and the appended drawing, in which—

Figure 1:
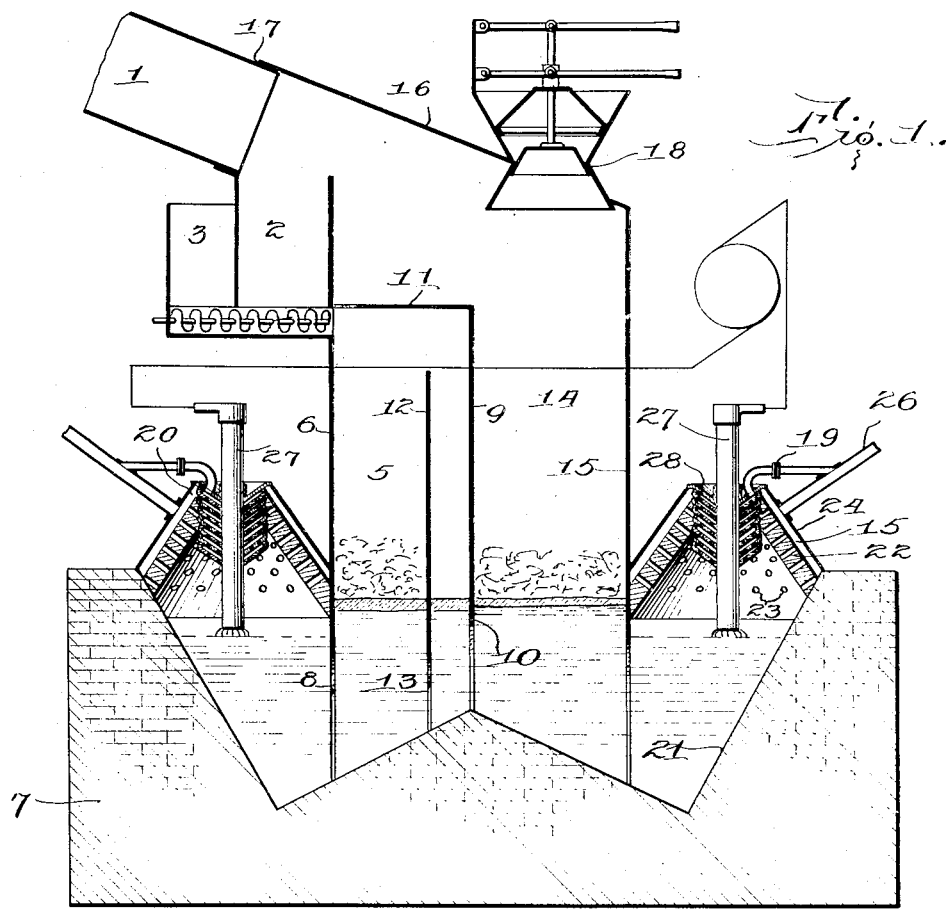
Fig. 1 is a diagrammatic elevation of an electric furnace having two heating units.

For purpose of illustration, I have shown in Fig. 1 a metallurgical furnace in which the ore after being roasted is passed through the rotary reducing kiln 1 and delivered to the bin 2.

Another bin 3 supplies carbonaceous fuel and such other material as may be found desirable.

A screw conveyer 4 delivers the reduced, or partially reduced metal from bin 2 and at the same time mixes these materials with the charge from bin 3. This mixture is then received in the vertical retort 5. This retort 5 has an outer wall 6 resting on foundation 7 and providing an archway or opening 8 at its base. An inner wall 9 is similarly mounted upon the base 7 and cut away to form the arch 10. The retort 5 has a top wall 11. Mounted on foundation 7 and extending upwardly in the retort 5 is a partition 12, also provided with an arched opening 13 at its base. The partition 12 extends upwardly to within a short distance of the top wall 11 and is spaced near the inner wall 9. This provides a vertical channel at the side of the material in the main portion of retort 5.

The side wall 9 serves as one side of the tower 14 having opposite outer wall 15 and a top 16 which is prolonged to form an opening 17. This opening 17 forms a close bearing with the rotary kiln 1. A charging device 18, of customary form, is provided in the top 16 in order to replenish the materials in the molten bath at the base of the tower.

The electric furnace proper may consist of a plurality of similar units of which two have been shown by way of example in the drawings. Each unit 19 and 20 is independent in its operation and in its individual relationship with the metallurgical furnace above described. The heating unit consists of a furnace bottom 21 upon which is mounted a roof 22 in the form of an inverted cone. This roof is constructed of refractory material in which are provided transverse apertures 23. These apertures may be integral parts of the roof building material or may be formed by the crevices between the brick work of which the roof is made. Surrounding the roof 22 is a shell 24 which is spaced from the roof and provides air chambers or channels 25 communicating with the apertures 23. A gas inlet port 26 connects with the chambers or channels 25. This inlet port draws a supply of an appropriate gas from a source not shown in the drawings.

Figures 2, 3:
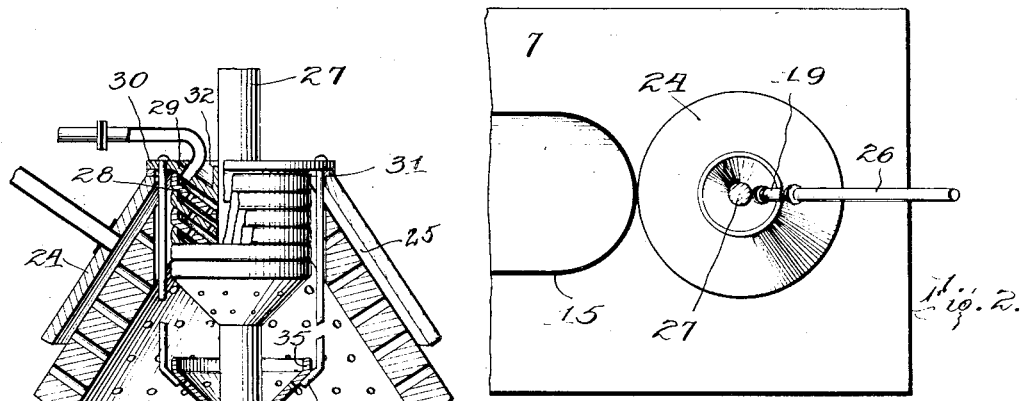
Fig. 2 is a fragmental plan view of one heating unit.
Fig. 3 is a vertical section of the heating unit.

The roof 22 has a central aperture through which the electrode 27 is fed vertically. Within the aperture of the roof and separating the electrode from the walls is a cooling device 28. This cooling device, as shown in Fig. 3, consists of a series of inverted deflectors or cones which may be constructed of metal or heat resisting material. The uppermost annulus or cone 29 has an external flange 30 resting above the shell 24 and spaced therefrom by an insulated ring 31. A collar 32 is formed on the inner periphery of the upper cone 29 and forms a vertical bearing in which the electrode is received. This collar 32 fits closely around the electrode and serves to minimize the escape of gases fed to the furnace at this point. Instead of collar 32 a series of packing rings or gaskets of suitable material may be used to slide upon the electrode and to rest upon the cone 29. A series of rods 33 are suspended from the flange 30 and terminate in the inwardly bent extensions 34. These extensions 34 are attached to the lower-most cone in the series and serve thus to support the entire series of cones and hold the same against relative movement. The wall 22 is spaced from the rods 33 and the series of cones by an air gap, as will be evident from Fig. 3.

Each cone except the uppermost is formed with a vertical flange 35. The cones are perforated as shown at 36. An insulated inlet port 37 is connected with the gas supply and delivers a stream of gas beneath the uppermost cone 29. This gas will pass between the cones and will be delivered in a downward direction around the electrode.

The electrode 27 is suspended through the roof of the furnace with its lower end near the surface of the molten metal upon the bottom 21. A suitable electric current is passed from the electrode through the molten bath and returned by the necessary conductors, the bath forming part of the circuit. As shown in the form illustrated in Figure 1, this circuit may include one electrode, the molten bath, and the opposite electrode through which the current returns to the source. The electrodes are insulated from the roof of the furnace by means of the rings 31.

The cooling gases are fed through the port and the uppermost cone 29. The gases pass between cone 29 and the adjacent cone 35 being directed against the surface of the electrode. As the gases come in contact with the electrode they follow the latter into the main area of the furnace and above the surface of the molten bath. A portion of the gas will escape downwardly through the cone 35 through the holes 36. The gas current will then pass inwardly between the adjacent cones 35 and join the other currents sweeping downwardly in contact with the surface of the electrode. Similar currents will pass through the apertures 36 of each cone and in contact with the electrode surface. This stream of gas serves to induce flow downwardly into the furnace around the electrode and therefore minimizes any tendency which part of the gases may have to escape upwardly through the collar 32. As the gas comes in contact with each of the cones 35 it serves to maintain these in cooled condition and prevents undue radiation of the furnace heat in this direction or against the upper surface of the electrode. During this operation these gases become heated, and pass across the surface of the molten bath and escape into either the retort 5 or the tower 14.

The relative amount of cooling gases passing through the several cones may be controlled as desired and in addition to the apertures 36 separate channels may be provided for bringing fresh gases directly into contact with the lower cones of the series.

The gases primarily used to supply the cooling jets in the above manner are carbon monoxide, carbon dioxide, water vapor or a mixture of the same. These may be produced independently or may be drawn from other steps in the metallurgical process. During the passage of these gases through the furnace and over or through the molten bath they are subjected to further reduction where their nature permits, in the manner set out in my copending applications, Serial No. 499,673, filed September 10, 1921, and Serial No. 499,674, filed September 10, 1921. The gases escaping from the furnace 19 will pass upward through the tower 14. This tower will contain a body of highly heated coke or other fuel received through the charging device 18. As the gases pass through this material they are further improved and pass from the outlet 17 for the treatment further of the ores.

The gases from the furnace unit 20 will pass upward through the retort 5 which will contain metal, low oxides of metal, carbon and suitable flux. In this retort the reduction of the metal is carried out while the incoming gases may serve to reduce and agitate the material in their upward travel. The metal is absorbed by the molten bath while the gases pass downwardly between the partition 12 and wall 9. They then pass through the arch 10 and are reduced by contact with the metal and carbon in said bath.

From the above description, it will be evident that there is provided a novel electric furnace accomplishing the melting and heating of a body of metal with a conservation of heat by reason of the inward passage of gases through the walls and roof of the structure. Concurrently the walls and roof of the furnace are preserved against excessive wearing away due to high temperatures. A further result resides in minimizing the detrimental escape of the furnace gases from the opening through which the electrode is suspended. It will be evident that many changes may be made in minor details and proportions with departing from the spirit of the invention as defined in the following claims.

What I claim is:

1. An electric furnace including a bottom and a roof, an electrode entering said furnace, a source of electricity in circuit with the electrode and the material in the furnace, electrode cooling means including a gas inlet port and means directing a current of gas into the furnace along the peripheral surface of the electrode.

2. An electric furnace including a bottom and a roof, an electrode entering said furnace, a source of electricity in circuit with the electrode and the material in the furnace, electrode cooling means including a gas inlet port and means directing a plurality of gas currents into the furnace along the peripheral surface of the electrode.

3. An electric furnace including a bottom and a roof, an electrode entering said furnace, a source of electricity in circuit with the electrode and the material in the furnace, electrode cooling means including a gas inlet port and means directing a plurality of gas currents inwardly along the peripheral surface of the electrode.

4. An electric furnace including a bottom and a roof, an electrode entering said furnace, a source of electricity in circuit with the electrode and the material in the furnace, electrode cooling means including an annulus having a gas inlet port, and a series of communicating spaced deflectors.

5. An electric furnace including a bottom and a roof, an electrode entering said furnace, a source of electricity in circuit with the electrode and the material in the furnace, a shell surrounding the roof, a gas inlet for said shell and passageways through the roof communicating with the shell.

6. An electric furnace including a bottom and a roof, an electrode entering said furnace, a source of electricity in circuit with the electrode and the material in the furnace, a shell spaced from the roof to form a channel, a gas inlet for said shell, and passageways communicating through the roof with the said channel.

7. An electric furnace including a bottom and a roof, an electrode entering said furnace, a source of electricity in circuit with the electrode and the material in the furnace, means for cooling the roof by incoming currents of gas, and a chamber to which the gas is delivered after passing through the furnace.

8. An electric furnace including a bottom and a roof, an electrode entering said furnace, a source of electricity in circuit with the electrode and the material in the furnace, means for cooling the roof by incoming currents of gas, and a chamber to which the gas is delivered after passing in contact with the material in the furnace.

In testimony whereof, I have hereunto affixed my signature.

JOHANN E. LEONARZ.